INVENTORS
WILLIAM C. RIESTER
AND RAYMOND D. PAGE
BY
E. H. Liss
ATTORNEY.

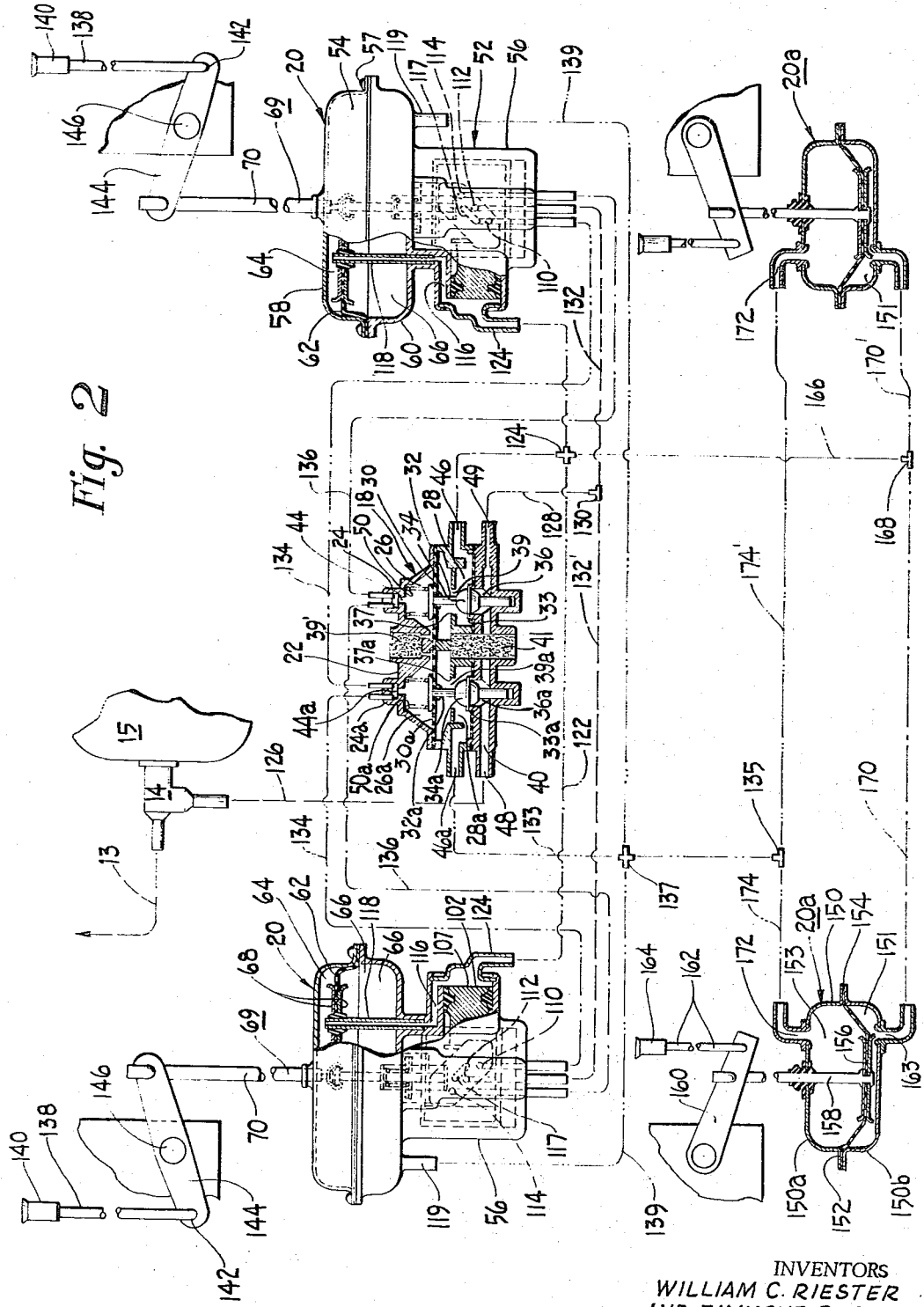

3,357,215
VEHICLE DOOR LOCKING SYSTEM
William C. Riester, Williamsville, and Raymond D. Page, Eggertsville, N.Y., assignors to Trico Products Corporation, Buffalo, N.Y.
Filed Dec. 7, 1964, Ser. No. 416,258
6 Claims. (Cl. 70—264)

The present invention relates to an improved automatic door locking system for automotive vehicles and, more particularly, to a fluid pressure operated door locking system wherein manual operation of the conventional push button, one of the inside door handles, or one of the key locking mechanisms effects simultaneous locking or unlocking of a plurality of doors.

The automatic door locking system of the present invention provides convenience and prevents theft of the vehicle or the contents of the vehicle due to inadvertent failure to lock one or more of the doors of the vehicle. Heretofore, automatic door locking systems have been provided which include door locking in response to vehicle motion, engine operation or operation of other devices connected with moving the vehicle. These door locking systems have included manual control means. The manual control means in prior art systems require a self-returning control to release the fluid pressure hold on the door locking system and to reset the system for a subsequent locking or unlocking operation. Such manual remotely controlled door locks, of course, offer a convenience but require separate manual controls in addition to the conventional door locking controls. The conventional manual push button control, for example, on a vehicle door lock is incapable of being utilized with a self-returning operator. When the button is depressed it must stay down to maintain the doors in a locked position, and when it is raised it must remain raised to maintain the doors unlocked. With the present invention depression of the door locking button on any one of a plurality of doors is capable of locking all of the doors of the vehicle, and raising of any selected one of a plurality of door locking buttons is capable of unlocking all of the doors. When the button is either raised or depressed, the lock is reset automatically for the next operation. This is accomplished through the use of a unique fluid pressure system incorporated in a servo-motor for operating the door lock. The present invention, further, enables the vehicle operator to remotely lock or unlock all of the doors not only by actuating the push button but also by operating the conventional key lock. The operator or a passenger may also effect unlocking of all doors by operation of an interior door handle.

The principal object of the present invention is to provide an improved door locking system wherein manual operation of a conventional door operating latch lock mechanism will serve to lock or unlock, respectively, all doors of the vehicle.

Another object of the invention is to provide an improved door locking system wherein operation of any one of a plurality of selected manual door operating locking mechanisms will effect locking or unlocking of all of the doors of the vehicle and will reset the system for the next operation.

Other objects and advantages of the invention will be apparent from the following detailed description taken in connection with the accompanying drawings in which:

FIG. 2 is a schematic flow diagram, partly in cross section, showing the system of the present invention embodying FIG. 1 with certain salient components thereof in detail;

Figure 1:
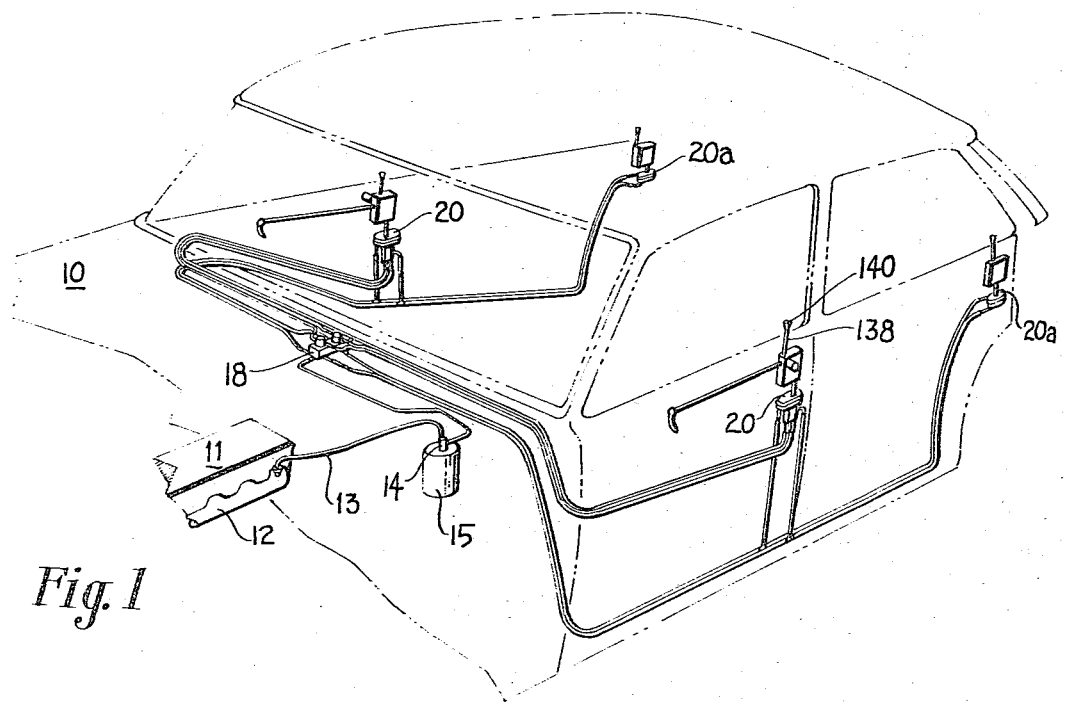
FIG. 1 is a perspective view of an automotive vehicle incorporating the improved door lock system of the present invention.

Briefly, the door locking system of this invention comprises a power unit including a servo-motor connected through a linkage system to a lever on a conventional door lock. The power unit may be utilized in at least one door and preferably two or more doors, or a power unit may be provided in the two front doors, or in the driver's door and one rear door, or in all four doors. As shown, there is a power unit in each of the two front doors of the vehicle and simple servo-motors in the remaining doors.

A vacuum storage source is provided which is charged by manifold vacuum. A central distributor valve or remote valve is provided for distributing vacuum pressure to each of the servo-motors and for relieving vacuum pressure subsequent to an operation.

The power units include a housing having a power diaphragm chamber and a valve chamber. The power diaphragm chamber is divided into first and second compartments by a diaphragm. The first compartment communicates through the remote valve with the vacuum source during the locking operation at which time the diaphragm is drawn in a direction to move a lever associated therewith in a direction to effect locking of the latch lock. The second compartment communicates with the vacuum source through a remote valve during an unlocking operation and moves the diaphragm in a second direction opposite the first direction and moves the lever which is connected to the door latch lock in a direction to effect unlocking. The valve chamber includes a valve which is reversibly slidable in two directions perpendicular to each other. When a mechanical control of a door latch lock having a power unit is manipulated to a locking position, the lever system moves the diaphragm to the locking position. The diaphragm is operatively connected to the slidable valve in the power unit to move it in one of its reversible directions wherein the vacuum source is connected through the slidable valve to the remote valve. This operates the remote valve to effect communication through a manifold chamber to all of the power units and servo-motors thereby applying vacuum to the locking compartments. Movement of the respective diaphragms, in turn, locks all of the other doors. When this occurs, the vacuum source also communicates through the manifold of the remote valve to a first side of a reset piston to effect movement of the piston in one direction. The reset piston is operably connected with the slide valve in the power unit to effect movement in its second direction. Movement in this direction results in interruption of communication between the source of vacuum and the remote valve. This results in interruption of communication between the manifold chamber of the remote valve and the locking compartment of each of the servo-motors. A bleed is provided in the operating compartment of the remote valve. There is also an atmospheric bleed in the manifold chamber of the remote valve which permits bleeding of the locking compartments of the servomechanism. Thus no unbalanced pressure exists in the system following a locking operation. The system is thereby reset for the next operation which, of course, will be an unlocking operation.

The unlocking operation is similar. The button or other mechanical control on the door of the vehicle may be manipulated to an unlock position causing the diaphragm and its associated power unit to move toward the second servo-motor compartment. At the same time the slide valve moves in a direction opposite the direction in which it moves during the locking operation. The slide valve then effects communication from the source of vacuum to the operating compartment side of the unlocking section of the remote valve. The remote valve then effects communication between the vacuum source and the unlocking compartment in all of the power units and servo-motors. Simultaneously, vacuum is admitted to a second side of the power unit piston opposite to the side to which it is admitted during locking. This effects motion in a second direction of the second reversible mode of movement to again effect interruption of communication between the operating compartment of the remote valve and the vacuum source. When this occurs both the operating compartment of the unlocked side of the remote valve and the unlocking chamber of the remote valve bleed to atmosphere again, resetting the system to render it operable in a subsequent locking operation.

In FIG. 1 automotive vehicle 10 is shown having an engine 11 with the usual engine intake manifold 12 which produces vacuum whenever the vehicle engine is in operation. This vacuum is a source of energy utilized for effecting remote locking of the vehicle doors. It is, of course, to be understood that with suitable modifications, the present invention may be used with a source of compressed air instead of vacuum or with any other fluid pressure source. Locking is effected through a fluid pressure circuit which includes a conduit 13 having one end thereof in communication with manifold 12 and the other end coupled to check valve 14 which is in communication with vacuum tank 15. Check valve 14 may be of any suitable or conventional construction provided it operates in such a manner that whenever the vacuum in conduit 13 leading to manifold 12 is greater than the vacuum in vacuum tank 15, which alternately communicates with the door locking motors, there will be an evacuation of vacuum tank 15. However, during periods of low manifold vacuum, check valve 14 will close and vacuum tank 15 will act as a source of vacuum for operation of this system. Check valve 14 will prevent a loss of vacuum from tank 15 to manifold 12 whenever the vacuum in tank 15 is greater than the vacuum in the manifold. A remote valve or distributor valve 18 is connected in the circuit between the source of fluid pressure 15 and the door locking power units 20 and servo-motors 20a to control flow of fluid pressure from the source or vacuum tank 15 to the door locking servo-motors, to effect either locking or unlocking of the doors.

The control valve 18 is a dual valve assembly and may be of the type utilized as a control valve in Patent No. 3,042,135 by W. C. Riester issued July 3, 1962 and assigned to the assignee of the present invention. The remote valve comprises a body or housing 22 which encloses a locking valve section 24 and an unlocking valve section 24a. Each of the housings 24 and 24a are identical in construction and include operating chambers 26 and 26a respectively, distribution chambers or manifold chambers 28 and 28a respectively and an inlet passage 40.

The manifold chambers 28 and 28a are separated from the operating chambers 26 and 26a by poppet valves 34 and 34a. The valves 34 and 34a are adapted to engage seats 37 and 37a which circumscribe openings 39 and 39a between the operating chambers 26 and 26a and the manifold chambers 28 and 28a. The poppet valves 34 and 34a also engage seats 33 and 33a which circumscribe openings 36 and 36a between the manifold chambers 28 and 28a and the intake passage 40. The poppet valves 34 and 34a are operated between seats 37, 37a and 33, 33a by a diaphragm 30 which separates the operating chambers 26 and 26a into two compartments. Valve stems 32 and 32a respectively are carried by valves 34 and 34a and are secured to the diaphragm 30 separately in each of the chambers 26 and 26a for movement therewith. The remote valve 18 includes ports 44 and 44a leading to the operating chambers 26 and 26a on the locking and unlocking sides respectively. Suitable ports 46 and 46a are provided in communication with the manifold chamber for connecting to the power units and servo-mechanisms. Suitable ports 48 and 49 are provided for connecting the intake passage 40 to the vacuum source and to the power units respectively. The diaphragm 30 is biased by springs 50 and 50a to maintain the valves 34 and 34a in a normally closed position.

As shown, a power unit 20 is utilized in each of the two front doors of the vehicle. The power units 20 are identical in construction and for the purpose of clarity and brevity only one will be described in detail. The power unit 20 includes a housing 52 having a globular section 54 which houses the servomotor portion of the power unit and a section 56 which houses the reset piston and slide valve assembly. The globular section 54 is formed of two halves secured together by rivets 57 or other suitable means, as, for example, welding or crimping. The outer half 58 is a cup-shaped structure and the lower half 60 is also a cup-shaped structure integral with the section 56. A diaphragm 62 separates the globular section 57 into a first locking compartment 64 and a second unlocking compartment 66. The outer or cover portion 58 and the lower portion 60 each include a peripheral annular flange which flanges are disposed in face-to-face relationship and between which is interposed the periphery of the diaphragm 62. Diaphragm 62 may be of any suitable flexible or elastomeric material, as for example, rubber, neoprene or other rubberlike materials. A pair of rigid diaphragm plates 68 are disposed centrally on opposite sides of the diaphragm 62. These plates may be of metal or rigid plastic material. A shaft assembly 69 for engagement with the lever structure of the door lock mechanism extends outwardly through the section half 58 of the housing section 54 through a gland seal 72. The shaft assembly includes an outer shaft portion 70 and an inner shaft portion 71. The inner end of the shaft portion 70 terminates in a reduced end portion which extends through the diaphragm plate 68 and diaphragm 62 and is secured centrally to the diaphragm assembly. The reduced end portion forms a shoulder 74 which engages the outermost plate 68 and the free end of the reduced end portion is headed to rigidly secure the shaft 70 to the diaphragm assembly for movement therewith. A clip 76 is secured to the end of shaft 70 at the innermost side of the diaphragm assembly 61. Retained in the clip for universal motion is the inner shaft section 71 which forms a continuation of shaft 70 and is connected thereto for universal motion. It is substantially longitudinally movable with shaft section 70.

A U-shaped spring retainer 78 is provided which includes openings 80 and 80a on each leg thereof for slidable reception of the inner end of shaft section 71. The shaft 71 includes an annular flange 82 disposed intermediate the legs 81 and 81a of the spring retainer 78. In the section 56 of the power unit 20 is disposed valve assembly 84, which includes a valve cage 86. Valve cage 86 receives a slide valve 88. A spring 90' is provided to bias the slide valve 88 against its seat 90 through which are formed ports 110, 112 and 114. The valve cage has pivoted thereto by a pivot pin 92 a valve operating lever 94. A sliding seal 93 and a spacing 95 is disposed between the valve operating lever 94 and the outer surface of the valve cage 86. The valve operating lever 94 extends generally in parallel, spaced longitudinal alignment with the shaft assembly 69 and moves generally parallel thereto. The valve operating lever 94 includes an upturned portion 96 with an opening for receiving the shaft section 71. The upturned portion 96 is disposed between the annular flange 82 of the shaft 71 and the inner leg of the retainer 78. Adjacent to the upturned portion 96 is a spring retaining washer 98. A coil spring 100 is confined between the retaining washer 98 and the inner leg of the spring retainer 78 about the shaft 71. The spring retainer 78, the spring 100 and the flange 82 serve to provide lost motion during linear movement of the shaft assembly 69 and to take up over-travel when necessary, since the displacement of the valve from one operative position to another is different from the displacement of the door locking mechanism. The valve 88 is displaced in one direction by longitudinal motion of the shaft 71 in response to movement of the diaphragm 62. The valve 88 is also displaceable in a second direction perpendicular to this first direction in response to movement by a piston assembly 102. A piston rod 104 is secured to second upturned portion 105 on valve operating lever 94. At generally right angles to the valve operating lever 94, the piston is slidable in a cylinder portion 106 of the housing section 56 and is integral with the free end of the piston rod 104. The sliding seal 93 separates the valve portion of housing section 56 from the cylinder portion 106. A resilient packing 108 is provided about the periphery of the piston 107 to maintain a sealing relationship between opposite sides of the piston.

Looking now at FIG. 2, it will be noted that the valve housing section 56 includes three ports—110, 112 and 114. A port 116 in the valve housing section 56 communicates with the first side of piston assembly 102 and the locking compartment 64 of the globular section or servo-motor section 54 through a conduit 118 which passes through diaphragm 62. A port 119 communicates with the unlocking chamber 66 of servo-motor section 54 and through opening 120 between housing sections 54 and 56 with the inner side of the piston assembly 102. The port 116 is connected through conduit 122 and conduit connector 124 with the manifold port 46 of the remote valve 18 and with the locking side of the diaphragm of each of the servo-motors. The vacuum source is connected through a conduit 126 to a port 48 of the remote valve which leads to the intake passage 40 of the remote valve 18. The port 49 of the intake passage 40 of the remote valve 18 is connected through a conduit 128 and a T 130 to conduits 132 and 132′ which lead to intake ports 112 of each of the power units 20. The port 110 of each of the power units is connected through a conduit 134 to the port 44a on the unlock side of the remote unit 18 leading to the operating chamber 26a. The port 114 is connected through a conduit 136 to the port 44 on the locking side of the remote valve 18 leading to the operating chamber 26. The slide valve 88 includes an elongated recess 117 which is movable to positions which connect either ports 110 and 112, or ports 112 and 114, or to a position displaced from any of the ports whereby the ports 110, 112 and 114 are dead ended.

Figure 6:
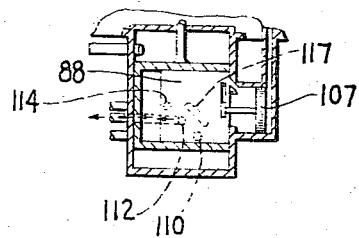
FIGS. 6, 7, 8 and 9 illustrate, diagrammatically, the piston-operated valve utilized in the servo-motor in its various positions.
Figure 7:
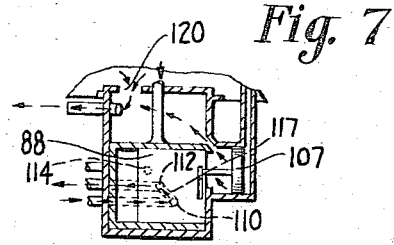
Figure 8:
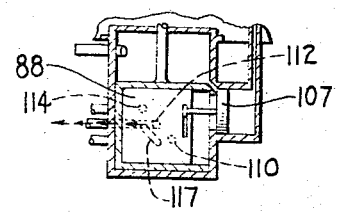
Figure 9:
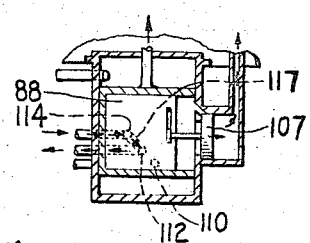
Figure 3:
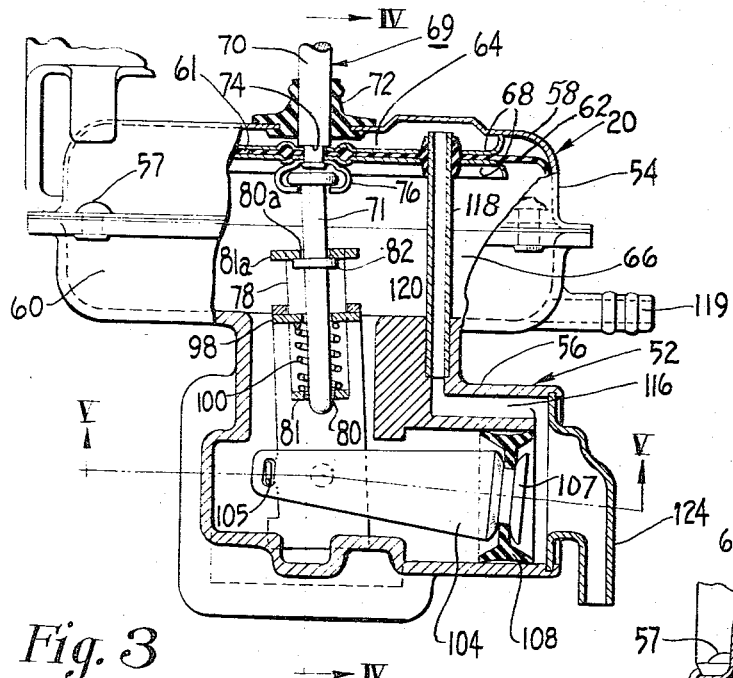
FIG. 3 is a side elevational view, partly in section, of the servo-motor utilized in this invention.

To actuate the power unit a locking stem 138 is provided having a manual push button 140 secured to the end thereof. The locking stem 138 is pivotally attached at 142 to a lever 144 pivoted at 146. It will be understood that pivoting of the lever 144 in a clockwise direction, as viewed in the right hand unit FIG. 2, causes locking of the door lock, and pivting in a counterclockwise direction effects unlocking. The pivot 146 may be rotated in either clockwise or counterclockwise direction by actuation of the stem 138, or by operation of a key, and may be moved in an unlocking direction through linkage from an inside door handle. Any of these modes of manual control results in the same action at the power unit 20. A locking action raises the shaft 70 and unlocking action depresses the shaft 70. The movement of the slide valve 88 in response to movement of the shaft 70 and subsequent operation of the power unit can best be seen in FIGS. 6, 7, 8 and 9. Movement of the shaft 70 upwardly as seen in FIG. 2 to a locking position in turn causes upward movement of the slide valve 88 to a position where recess 117 connects port 114 with port 112, as seen in FIG. 9. During the locking action, the piston is drawn to the position shown in FIG. 6, moving the slide valve 88 to a position where the slide valve closes the ports 110, 112 and 114. This is the rest position of the lock. It is ready for a subsequent operation in this position. When the shaft 70 is moved downwardly from the position seen in FIG. 2, the slide valve 88 is moved to the position seen in FIG. 7 wherein the recess 117 straddles and connects ports 110 and 112 to effect flow within the vacuum source on the unlock side of the remote valve. Vacuum is then supplied through the remote valve to the servo-motor section 54 of each power unit 20 and to the simple servo-motors to effect an unlocking operation, and at the same time, the piston is actuated by vacuum pressure to the position shown in FIG. 3 wherein communication is interrupted between ports 110 and 112. The valve 88 effectively closes all of the ports 110, 112 and 114. The system is then in a rest position as seen in FIG. 8 and the locking system is ready for a subsequent action. This is the unlock position at rest.

The above described operation can be accomplished from either power unit and the action described will occur at all of the power units. In addition, the simple servo-units 20a will be actuated. These simple servo-units are identical and for the purpose of brevity, only one will be described. The servo-units 20a include a housing 150 comprising two formed halves, 150a and 150b, having annular radially outwardly extended flanges 152 positioned in opposite relation with the periphery of diaphragm 154 disposed therebetween. The diaphragm 154 divides the housing 150 into a locking compartment 151 and an unlocking compartment 153. The diaphragm assembly includes a pair of plates 156 disposed centrally on opposite sides of the diaphragm. A shaft 158 is rigidly secured to the plates 156 for movement with the diaphragm 154. The shaft 158 is secured to a lever 160 which operates the latch lock device. The lever 160 may also be operated by a stem 162, having a manual push button 164 at the free end thereof. The lock can also be operated by an inside door handle, not shown. The housing 150 includes a port 163 leading to the locking compartment 151 and connecting with the locking conduit 122 through the connector 124, conduit 166, T 168 and conduit 170. An unlocking port 172 communicates with the unlocking port 46a of the remote valve 18 through a conduit 133, a T 135 and a conduit 174. Similarly, the other simple servo-unit is connected to the locking and unlocking circuits, respectively, from T 168 and T 135, through conduits 170′ and 174′, respectively.

Figure 4:
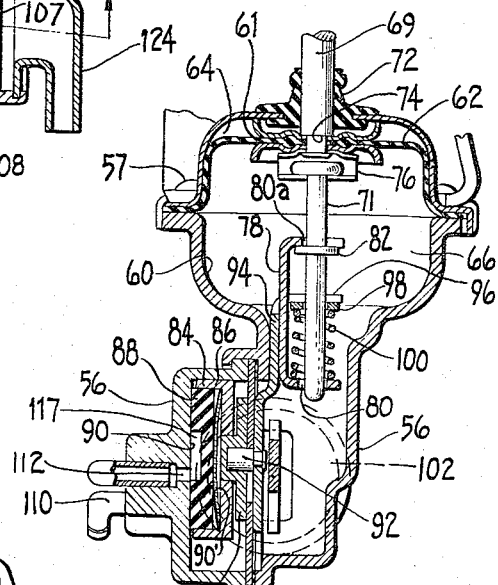
FIG. 4 is a sectional view taken on line IV–IV of FIG. 3, looking in the direction of the arrows.
Figure 5:
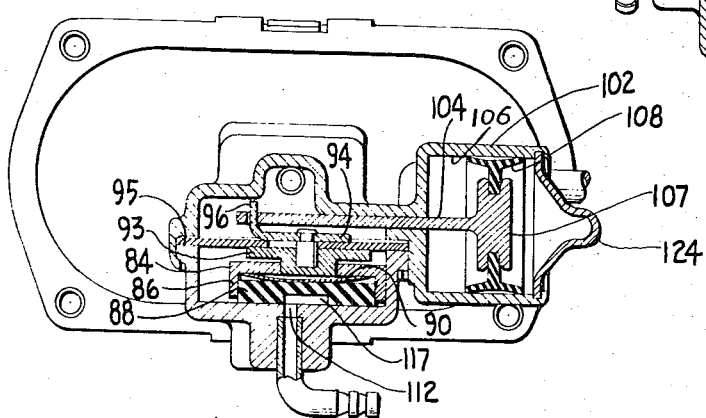
FIG. 5 is a sectional view taken on line V—V of FIG. 3, looking in the direction of the arrows.

The operation of the device should now be apparent. Assuming that the door is in the position shown in FIG. 2, that is, the locking position at rest with the reset piston 107 of the power unit 20 in the position shown in FIG. 6, and that it is desired to unlock the door, the operation is as follows: a key may be turned in the lock, or push button 140 may be raised, or the inside door handle may be moved toward an opening position. Each of these operations will rotate the lever 144 in a direction to actuate the power unit at that particular door. This will move the shaft 70 inwardly along with the diaphragm 62 and the slide valve 88. This operation takes place as follows: looking now at FIG. 4, the annular flange 82 on the shaft section 70a will engage the washer 98 tending to compress the spring 100 but effecting movement of the spring retainer 80. The upturned flange of the leg 81a of the spring retainer will, after some lost motion, engage the upturned flange 96 of the valve operating lever 94 moving the valve cage 86 to the right from the position in FIG. 4, causing movement of the slide valve 88 to a position where the recess 117 connects the ports 110 and 112. Vacuum will then be admitted from the vacuum tank 15 through conduit 126, port 49 of the remote valve through inlet passage 40 of the remote valve and out through port 48 of the remote valve through conduit 128, T 130, conduit 132′ and port 112 to the recess 117. Vacuum will flow in through the recess 117, port 110, conduit 134 to unlock port 44a, and thence to the operating chamber 26a on the unlock side of the remote valve. This will cause movement of the diaphragm 30a against the bias of spring 50a raising the poppet valve 34a from its seat 33a to seat 37a between the operating chamber 26a and the manifold chamber 28a. The inlet passage 40 will now be in communication with the manifold chamber 28a. Vacuum will now flow from the inlet passage 40 through the valve port 37a between the inlet passage 40 and the manifold chamber 28a. From the manifold chamber, vacuum will flow through port 46a, conduit 133, junction 137, conduit 139 and port 119 of the power unit 20 to the unlocking compartment 66 of the servo-motor section of the power unit. Simultaneously, vacuum will flow from the junction 137 through the T 135 to the unlocking side of the simple servo-motors 20a and through the junction 137 to the unlocking compartment of the servo-motor portion of the other power unit. The unlocking side of each of the servo-motor sections of the power unit will be in communication with the inner side of the piston 102, thereby drawing the piston inwardly and causing movement of the valve 88 to the position shown in FIG. 3 wherein the recess 117 is displaced from the ports 110 and 112 effecting dead ending of the vacuum from the ports to the power unit. With the vacuum through conduit 134 interrupted, chamber 26a on the unlock side of the remote valve will bleed through atmospheric bleed 39 permitting the spring 50a to return the diaphragm and the poppet valve 34a to the seat 33a. This will interrupt vacuum flow between the inlet passage 40 of the inlet valve and the manifold chamber 28a. With vacuum flow to the locking compartment of the servo-motor sections of the power units, as well as to the locking section of the simple servo-motors being interrupted, vacuum in these sections and in the manifold will bleed back through the manifold chamber 28 of the remote valve to the atmospheric bleed 41. The system will now be at rest, de-energized and ready for the next operation which, obviously, will be a locking operation.

Assuming now that the system is in an unlocked position, at rest, the locking operation is as follows: The button 140 may be depressed or the key may be rotated to move the lever to the position seen in FIG. 2. The lever 144 effects raising of the shaft 70, the flange 82 on the shaft 70 engages the leg 81a of the spring retainer 78, and force is applied in an outward direction through the leg 81a of the spring retainer and the spring 100, to drive the valve operating lever 94 outwardly, thereby moving the valve to the position seen in FIG. 4 and FIG. 9. In this position, the recess 117 connects the ports 112 and 114, and when ports 112 and 114 are connected, vacuum flows through conduit 126, port 48 of remote valve 18, passage 40 and out through port 49 of remote valve 18, through conduit 128, T 130, conduit 132', port 112, through recess 117 and port 114 to conduit 136. From conduit 136, vacuum enters through port 44 on the locking side of remote valve 18 to evacuate chamber 26. This causes diaphragm 30 to move against the bias of spring 50, and, in turn, moves the poppet valve from its lower seat 33 between the inlet passage 40 and the manifold chamber to its upper seat 37 between the operating chamber 26 and the manifold chamber 28. Vacuum then flows through the poppet valve from inlet passage 40 through port 46, conduit 123, junction 124, conduit 122, port 116, port 118, to the locking compartment 64 of each of the power units 20. Simultaneously, vacuum is applied in the cylinder chamber of piston 102, drawing the piston to the position seen in FIG. 2 and FIG. 6. Simultaneously, vacuum is admitted from junction 124 through conduit 166 and conduits 170 and 170' to the locking compartment 151 of the simple servo-units, as well as to the locking compartment and the servo-unit section of the other power unit, and to the cylinder. With the slide valve 88 now in the position seen in FIG. 6, the recess 117 is displaced from ports 112 and 114, thereby interrupting vacuum communication between the vacuum source and the remote valve operating compartment 26. The operating compartment 26 bleeds back through the atmospheric bleed 39' causing the diaphragm to return to its normal spring bias position where it displaces popet valve 34 to its lower seat between the inlet passage 40 and the manifold chamber 28. When this occurs, communication between the vacuum source in the locking compartments of the servo-units is interrupted, the vacuum bleeds back through the manifold chamber 28 and communicates with atmospheric bleed 41, thereby neutralizing all of the diaphragms. The system is again at rest in a locked position ready for a subsequent operation.

It is now apparent that a unique door locking system has been provided which permits utilization of the conventional locking mechanism normally found on a motor vehicle and which permits remote operation of all of the doors in the vehicle by operating of one of these conventional means—push button, door handle or key lock. The system automatically resets itself for subsequent operation and incorporates a unique piston operated valve structure in the servo-unit. Although a certain specific embodiment of the invenion has been shown and described, for the purpose of illustration it will be apparent that various modifications and other embodiments are possible within the scope of the invention. It is to be understood, therefore, that the invention is not limited to the specific arrangement shown but, in its broadest aspects, it includes all equivalent embodiments and modifications which come within the scope of the invention.

What is claimed is:

1. In a fluid operated door locking system for automotive vehicles including a plurality of doors, a plurality of latch-lock mechanisms each disposed in a door of said vehicle, a plurality of fluid actuated power units and manually manipulatable mechanical means for operating each of said latch-lock mechanisms; each of said power units comprising movable means operatively connecting the power unit to the latch-lock mechanism for actuation of the latch-lock mechanism by the power unit, valve means operatively connected to said movable means responsive to operation of any one of said manually manipulatable mechanical means for effecting actuation of all of said power units, said valve means including fluid pressure feedback responsive means operable to effect resetting of all of said power units for a subsequent latch-lock operation in response to actuation of said power units.

2. In a door locking system for automotive vehicles including a plurality of doors, a latch-lock mechanism disposed in each of said doors, manually manipulatable mechanical means for operating each of said latch-lock mechanisms, and a plurality of power units each disposed at a door for operating said latch-lock mechanism; said power unit comprising a diaphragm operated shaft means operatively connecting the power unit to the manually manipulatable mechanical means and to the latch-lock mechanism for actuation thereof, slidable valve means operatively connected to said shaft means responsive to operation of any one of said manually manipulatable mechanical means for actuating all of said power units, said valve means including fluid pressure feedback responsive means being operable to effect resetting of all of said power units for a subsequent latch-lock operation in response to fluid power actuation of said power units.

3. In a door locking system for automotive vehicles including a plurality of doors, a latch-lock mechanism disposed in each of said doors, manually manipulatable mechanical means for operating each of said latch-lock mechanisms and a plurality of power units each disposed at a door for operating said latch-lock mechanism; said power unit comprising movable means operatively connecting the power unit to the manually manipulatable means and to the latch-lock mechanism for actuation thereof, slide valve means operatively connected to said movable means for reversible movement in a first linear path, piston means operatively connected to said slide valve means for reversibly moving said slide valve in a second linear path in angular relationship to said first linear path, said slide valve means being responsive to operation of any one of said manually manipulatable mechanical means for movement in said first linear path to actuate all of said power units, the slide valve means being movable in said second linear path in response to power actuation of the power units to effect resetting of all of said power units for a subsequent latch-lock operation.

4. In a door locking system for automotive vehicles having a plurality of doors, a latch-lock mechanism disposed in each of said doors, manually manipulatable mechanical means for operating each of said latch-lock mechanisms and a plurality of fluid pressure operated power units each disposed at a door for operating said latch-lock mechanism; each of said power units comprising a servo-motor having a chamber separated into a pair of compartments by a fluid pressure operated movable wall, plunger means operatively connecting the power unit to the latch-lock mechanism and to the manually manipulatable mechanical means, said plunger means being operatively connected to said movable wall for movement therewith, slide valve means disposed in said power unit for reversible movement in two paths angular to each other, said valve being operatively connected to said plunger means for movement therewith in the first of said two paths for connecting a fluid pressure source to one of said compartments on one side of said movable wall, and a piston operatively connected to said valve means for movement therewith in the second of said two paths of movement, said piston being responsive to application of fluid pressure to said movable wall for actuating said valve in said second direction to effect venting of the power unit compartment and interruption of communication between said pressure source and said compartment following a latch-lock operation whereby all of the power units are reset for subsequent latch-lock operation.

5. In an automotive vehicle having a plurality of doors, a latch-lock mechanism disposed in each of said doors and a plurality of manually manipulatable mechanical means for operating each of said latch-lock mechanisms; a power unit for operating said latch-lock mechanisms responsive to actuation of said manually manipulatable mechanical means, said power unit comprising a servo-motor having a chamber separated into a pair of compartments by a fluid pressure operated movable wall, valve housing and valve means disposed in said valve housing, a plunger means operatively connecting the power unit to the latch-lock mechanism and to the manually manipulatable mechanical means, said plunger means being operatively connected to said movable wall for movement therewith, said valve means operatively connected to said plunger for movement therewith to first and second positions, said valve housing including first and second port means for effecting communication between said source of fluid pressure and one of said pair of compartments to effect a locking operation when said valve means is disposed in said first position, second port means for effecting communication between said source of fluid pressure and the other of said pair of compartments to effect an unlocking operation when said valve means is disposed in said second position and fluid pressure responsive means for moving said valve to a position for interrupting communication between said source of fluid pressure and either of said compartments, said fluid pressure responsive means being actuatable by the fluid pressure applied to said compartments when said valve means is disposed in said first or said second positions whereby said valve means is movable sequentially to a position for effecting a locking operation, to a position for interrupting fluid communication, to a position for effecting an unlcking operation and to a position for interrupting fluid communication.

6. In an automotive vehicle having a plurality of doors, a latch-lock mechanism disposed in each of said doors and a plurality of manually manipulatable mechanical means for operating each of said latch-lock mechanisms; a door locking system comprising power units disposed for actuating said latch-lock mechanisms in certain of said doors and simple servo-motors for operating latch-lock mechanisms in the remaining doors, said power units each comprising a servo-motor and valve means, said servo-motors and said simple servo-motors comprising a chamber divided into a locking compartment and an unlocking compartment by a diaphragm, a plunger secured to each of said diaphragms for movement therewith and to said manually manipulatable mechanical means, said power units including a lunger extension connecting the plunger of said power unit to said valve means for actuating said valve means, said valve means including a valve and a valve housing, said valve housing including first, second and third ports, the first port of each valve housing communicating with the locking compartments of each power unit and each simple servo-motor, said second port communicating with a source of fluid pressure, and said third port communicating with the unlocking compartment of each power unit and each simple servo-motor, said valve being disposed for movement to a first position and a second position, said valve including means for connecting said first and second ports when in said first position and said second and third ports when in said second position, fluid pressure responsive means for moving said valve to a position for interrupting communication between said first and second and said second and third ports, and feedback means for supplying a portion of the fluid pressure supplied to the locking or unlocking compartments of said power units to said fluid pressure responsive means for effecting interruption of fluid pressure communication to said locking or unlocking compartments subsequent to a locking or unlocking operation.

References Cited

UNITED STATES PATENTS

| | | | |
|---|---|---|---|
| 2,799,154 | 7/1957 | Beal | 180—264 |
| 3,019,848 | 2/1962 | Garvey et al. | 180—822 |
| 3,064,752 | 11/1962 | Deibel et al. | 70—262 X |
| 3,070,184 | 12/1962 | Riester | 70—263 X |
| 3,096,845 | 7/1963 | Oishei et al. | 180—82.2 |

BOBBY R. GAY, *Primary Examiner.*